March 4, 1958 — A. R. JONES — 2,825,261

SCANNING INSTRUMENTS

Filed Sept. 3, 1954

INVENTOR.
ALAN RICHARDSON JONES
BY Rowland V. Patrick

United States Patent Office 2,825,261
Patented Mar. 4, 1958

2,825,261

SCANNING INSTRUMENTS

Alan Richardson Jones, Wellesley Hills, Mass.

Application September 3, 1954, Serial No. 454,013

1 Claim. (Cl. 88—14)

This invention relates to scanning instruments useful in detecting the images of microscopic particles present in an illuminated field for the purpose of counting, computing, or otherwise identifying said particles, and more specifically to mechanism for providing, in such instruments, relative mechanical scanning motion of a single beam of light of minute predetermined cross-sectional area and a field of material to be scanned.

The invention is particularly applicable to an instrument adapted for use in hematology, such as in making blood cell counts, and has for a particular object the provision of simpler mechanism for achieving accurate scanning of a field larger than the predetermined cross-sectional area of the image-detecting portion of the transmitted light, which for accuracy needs be minute.

The apparatus hereof includes an illuminator, a bed plate, a stage movable relatively thereto and having a chamber for receiving a specimen to be examined, a microscopic objective, and a precision aperture from which a restricted beam of transmitted light, as modified by images of particles interposed in the field, emerges for examination by the human eye or for detection by an equivalent electronic component, such as a photomultiplier tube, arranged if desired to actuate computer circuits.

In accordance with this invention, a specimen providing a field of material to be scanned is mounted on said stage for movement relative to said beam of light in a plane perpendicular to the path of light, said movement having components both transversely and longitudinally of said plane effective continuously to scan said field in a pattern substantially that of a sine wave.

It will be appreciated that any such movement is subject to the danger of loss of microscope focus, since any slight component of motion in the direction of the light beam may lead to focus loss. Hence, the moving mechanism of this invention is designed to minimize focus-impairing motion and to confine the scanning motion precisely to a plane.

Typical equipment in accordance with this invention is shown in the accompanying drawings, wherein.

Figure 1:
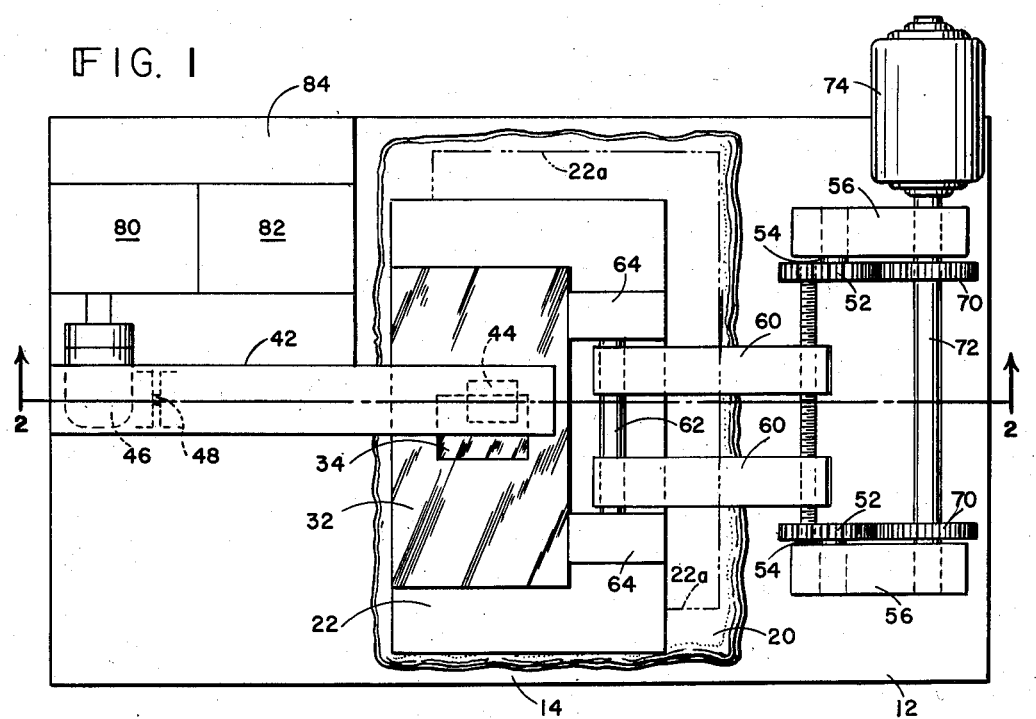
Fig. 1 is a plan view of a preferred embodiment thereof.
Figure 2:
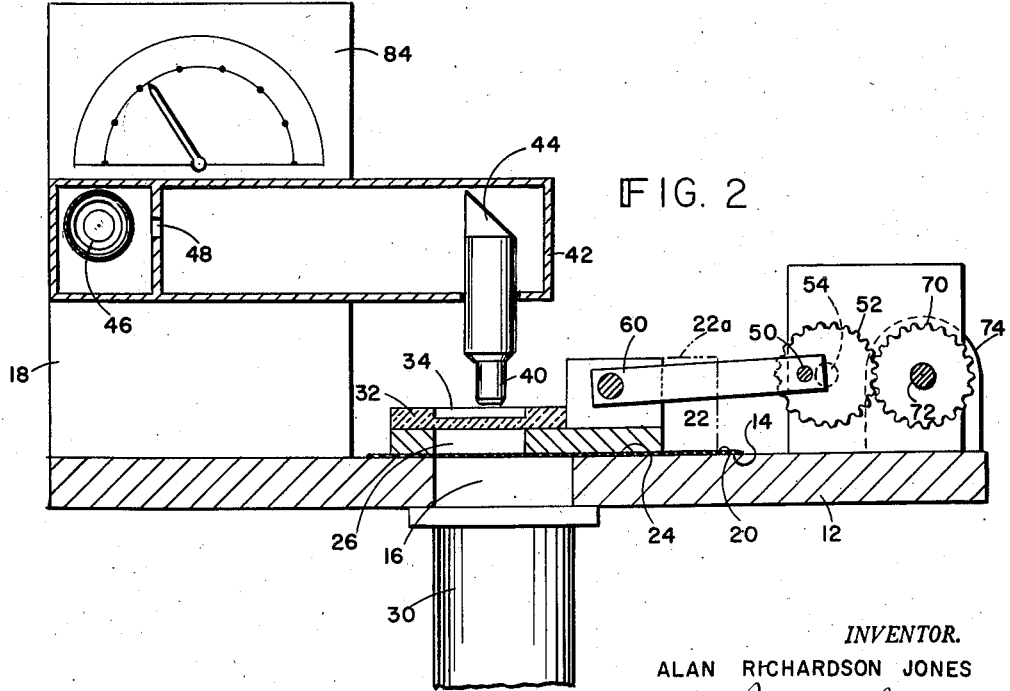
Fig. 2 is a cross-sectional side view taken on the line 2—2 of Fig. 1.

Referring to the drawings, the scanning apparatus of this invention includes a bed plate 12 having a flat upper bearing surface 14 adapted to support a stage 22 for sliding movement in a plane, a silicone oil lubricant 20 being interposed between said bearing surface 14 and the flat lower bearing surface 24 of said stage. A dark field illuminator 30 of a known type is mounted on the bottom of bed plate 12, suitable apertures 16 and 26 being provided in said bed plate and said stage, respectively, so that the light from illuminator 30 will pass upwardly therethrough.

In the particular embodiment shown in the drawings, a microscope 40 is positioned above aperture 26 of stage 22, said microscope being mounted at one end of a horizontally extending light tight box 42 mounted in fixed position on base 12 by a bracket 18. One end of microscope 40 extends into said box 42 and has mounted thereon a 45° prism 44 arranged to reflect the light received from the microscope horizontally through said box. At the other end of light tight box 42 is mounted a photomultiplier tube 46 or other suitable light sensitive device responsive to the intensity of light received from illuminator 30, the output of said tube being arranged to provide, through amplifier 80 and scaler 82, an indication of the number of particles detected by the photomultiplier tube. The display system of the scaler is shown schematically as a dial 84. An aperture 48 is provided between tube 46 and prism 44 to limit the field of view received from said microscope, said aperture being of accurately predetermined dimensions as hereinafter more fully explained.

The field of material to be scanned, for example, blood, is maintained in a container in the form of a glass plate 32 having therein a shallow recess or chamber 34 of generally rectangular area with dimensions at least as large as those of the field to be scanned. Such plate is preferably removable positioned on the upper surface of stage 22 with the chamber 34 positioned over apertures 16 and 26 so that the area of said chamber within the field of material to be scanned will be suitably illuminated.

In order to provide scanning movement of stage 22 relative to bed plate 12, suitable means is provided for moving said stage back and forth along said bed plate while simultaneously continuously moving said stage along the plane of the bed plate surface 14 in a direction perpendicular to said reciprocatory movement. Such means comprises a wheel crank mechanism wherein the reciprocatory movement is provided by the movement of a screw threaded crankpin 50 mounted eccentrically on and extending between a pair of gear wheels 52 having their main shafts 54 rotatably mounted in bearing blocks 56 on bed plate 12. A pair of connecting rods 60 are mounted at one end on said crankpin 50 by means of tapped holes cooperating with the screw threads on said crankpin and are mounted at their other ends for pivotal movement only on a shaft 62 extending between a pair of bearing blocks 64 on the upper surface of said stage 22.

The gear wheels 52 are rotated by means of cooperating gear wheels 70 fixedly mounted on a driving shaft 72 itself rotatably mounted in bed plate bearing blocks 56, said gear wheels 70 being driven by a reversible motor 74.

In operation, a sample of material, for example, blood in which the red cells are to be counted, is maintained on a slide plate in chamber 34. Assuming that the computer circuits comprising photomultiplier tube 46, its amplifier 80, and scaler 82 (and integrator indicator dial 84), are suitably energized and set to zero readings, and that stage 22 be positioned relative to bed plate 12 as shown in Fig. 1, motor 74 is started. As gear wheels 52 are revolved by said motor through cooperating gear wheels 70 on motor shaft 72, stage 22 is moved back and forth by crankpin 50 through connecting rods 60. Simultaneously, said connecting rods, being screw threaded on said crankpin 50, will be moved in a direction perpendicular to said reciprocatory movement, that is upwardly as shown in Fig. 1. The resultant scanning movement of such simultaneous transverse and longitudinal movement of stage 22 is substantially sinusoidal in form, although somewhat modified due to the finite length of connecting rods 60, and provides a scanning movement of the field of material to be scanned, the stage, at the completion of said scanning movement, being positioned as at 22a in Fig. 1.

The observed beam of light which is so moved relatively to the field to be scanned is of predetermined dimensions minutely smaller than that of said field, having a dimension perpendicular to the direction of scan of the order of two or three times the average diameter of the projected, magnified image of the particle to be counted. The dimension in the direction of scan being of the order of half the diameter of the projected image of the particle, with a lead of said crankpin screw thread of not less than the dimension of said observed field in that direction, the restricting aperture may be conveniently detachable for permitting use of a variety of interchangeable apertures of differing dimensions. For example, with blood wherein the red blood cells are of an average diameter of seven microns, an observed area having dimensions of 300 by 80 microns will be found suitable when scanning a twenty-times magnified image of these cells, using a screw thread lead of 32 t. p. i. As such minute area is in effect moved relative to the field to scan said field in accordance with the above-described track or pattern, the particles to be counted or otherwise sensed will appear to move into, along and from the observed area in general parallel to the short dimension thereof except at the ends of the reciprocatory movement. The multiplier tube 46, being responsive to the intensity of light from illuminator 30, will thus sense the presence of said particles in its observed field and produce output current variations or pulses in accordance therewith. Such pulses are amplified by amplifier 80 and then scaled by scaler 82, by which the number of pulses is summated and displayed at the completion of the scanning movement of stage 22, the total number of particles, such as red blood cells, will be recorded. Such electrical components are described in applications, filed simultaneously herewith of Frederick Brech, and of Frederick Brech jointly with myself, though they are not essential portions of the apparatus herein described which may be utilized with human eye counting.

Thus, it will be seen that a novel scanning apparatus for detecting the images of microscopic particles present in an illuminated field has been provided. Various modifications within the spirit of the invention and the scope of the appended claim will be apparent to those skilled in this art.

In a scanning instrument for detecting discrete microscopic particles in a specimen, in combination, a source of light, a precision aperture for beaming light emanating from said source, a stage adapted to hold in the path of said light a specimen providing a field in which particles are to be detected, bed means for supporting said stage for movement in a plane perpendicular to the path of said light, means for moving said stage with two dimensional components of motion in said plane to scan said field, said means comprising a crank having a screw-threaded crankpin, and a connecting rod threaded on said crankpin, means connecting said connecting rod to said stage, and means for reversibly actuating said crank.

References Cited in the file of this patent

UNITED STATES PATENTS 2,661,902     Wolff et al. _____ Dec. 8, 1953